United States Patent
Varney

(10) Patent No.: US 9,416,735 B2
(45) Date of Patent: Aug. 16, 2016

(54) EMISSIONS CONTROL DURING CAM PROFILE SWITCHING DIAGNOSTIC OPERATION

(75) Inventor: Brian Varney, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 327 days.

(21) Appl. No.: 14/125,655

(22) PCT Filed: Jun. 21, 2012

(86) PCT No.: PCT/EP2012/062037
§ 371 (c)(1),
(2), (4) Date: Mar. 4, 2014

(87) PCT Pub. No.: WO2012/175644
PCT Pub. Date: Dec. 27, 2012

(65) Prior Publication Data
US 2014/0202425 A1    Jul. 24, 2014

(30) Foreign Application Priority Data
Jun. 21, 2011    (GB) .................................. 1110490.8

(51) Int. Cl.
*F02D 13/02* (2006.01)
*F02D 41/00* (2006.01)
(Continued)

(52) U.S. Cl.
CPC ............ *F02D 13/02* (2013.01); *F02D 13/0226* (2013.01); *F02D 41/0002* (2013.01); *F02D 41/0082* (2013.01); *F02D 41/1443* (2013.01); *F02D 41/1454* (2013.01);
(Continued)

(58) Field of Classification Search
CPC .......... F02D 13/02; F02D 33/02; F02D 41/14; F02D 41/22; F02D 41/30; F02D 41/102; F02D 41/221; F02D 2041/001
USPC .......... 123/90.1, 90.11–90.18, 321, 322, 347, 123/348; 701/114; 73/114.69, 114.71, 73/114.77, 114.79
See application file for complete search history.

(56) References Cited

U.S. PATENT DOCUMENTS 5,009,203 A    4/1991   Seki
5,335,636 A *  8/1994   Bilei ...................... F01L 13/06
                                                                   123/321

(Continued)

FOREIGN PATENT DOCUMENTS

EP    0359363 A1    3/1990
JP    H033910 A     1/1991

OTHER PUBLICATIONS

Combined Search and Examination Report under Sections 17 and 18(3) for Application No. GB1110490.8 dated Oct. 12, 2011.

(Continued)

*Primary Examiner* — Hung Q Nguyen
*Assistant Examiner* — Johnny H Hoang
(74) *Attorney, Agent, or Firm* — Carlson, Gaskey & Olds

(57) ABSTRACT

A diagnostic routine momentarily forces an engine to an alternative operating condition, and at the same time adjust fuelling of the engine so as to be appropriate to the alternative operating condition (31). In one embodiment substantially unchanged exhaust constituents (32) indicate correct adoption of the alternative operating condition. In another embodiment a substantial change in a calculated measure is indicative of correct adoption of the alternative condition. The invention allows better control of undesired exhaust emissions during operation of the diagnostic.

14 Claims, 1 Drawing Sheet

(51) Int. Cl.
 *F02D 41/14* (2006.01)
 *F02D 41/22* (2006.01)
 *F02D 41/30* (2006.01)

(52) U.S. Cl.
 CPC ............ *F02D 41/221* (2013.01); *F02D 41/30* (2013.01); *F02D 2041/001* (2013.01); *F02D 2250/14* (2013.01); *Y02T 10/18* (2013.01); *Y02T 10/42* (2013.01)

(56) References Cited

U.S. PATENT DOCUMENTS

| | | | | |
|---|---|---|---|---|
| 5,644,073 | A * | 7/1997 | Matsuno | F01L 1/34 123/90.15 |
| 6,352,065 | B1 * | 3/2002 | Wild | F02D 41/0072 123/494 |
| 7,047,957 | B1 | 5/2006 | Smith et al. | |
| 2005/0044934 | A1 | 3/2005 | Weiss et al. | |
| 2005/0204805 | A1 * | 9/2005 | Wakahara | F01L 1/34 73/114.72 |
| 2006/0293832 | A1 | 12/2006 | Schwarzenthal et al. | |
| 2007/0240695 | A1 | 10/2007 | Mitsuda et al. | |
| 2008/0028844 | A1 | 2/2008 | Varney | |
| 2009/0107430 | A1 * | 4/2009 | Daigo | F01L 1/181 123/90.15 |
| 2011/0153181 | A1 | 6/2011 | Bagnasco et al. | |
| 2011/0219767 | A1 * | 9/2011 | Miyashita | F01L 1/267 60/600 |
| 2011/0265764 | A1 * | 11/2011 | Reiche | F02D 41/0025 123/435 |
| 2012/0023935 | A1 * | 2/2012 | Pursifull | F02D 13/0207 60/605.2 |

OTHER PUBLICATIONS

International Search Report for International application No. PCT/EP2012/062037 dated Nov. 8, 2012.

* cited by examiner

EMISSIONS CONTROL DURING CAM PROFILE SWITCHING DIAGNOSTIC OPERATION

FIELD OF THE INVENTION

This invention relates to better control of undesirable exhaust emissions of an internal combustion engine, and is particularly concerned with vehicles. Aspects of the invention relate to a method.

BACKGROUND

Internal combustion engines produce undesirable exhaust emissions, including CO, $CO_2$ and NOx. Vehicle engines are required to comply with legislative limits which prescribe the level of permitted emissions, typically over a standard driving cycle. The level of such emissions is being continually reduced.

A typical gasoline engine uses catalytically coated substrates in each exhaust system to minimize tailpipe emissions. Effective operation of these exhaust catalysts typically requires that the exhaust gas they are presented with is maintained at near to stoichiometric air:fuel ratios. In support of this the engines are provided with closed loop feedback control of fuelling, whereby an oxygen sensor in the exhaust tract determines whether the exhaust gases have an oxygen content indicative of non-stoichiometric combustion. The sensor output is used to continually adjust fuelling of the engine to compensate for a lean or rich mixture—thus gas flow through the catalyst is generally maintained at or close to stoichiometric, and undesirable emissions can be minimized.

Considerable advances have been made in closed loop feedback control of fuelling, but this approach can only correct fuelling after a departure from the target air:fuel ratio has been identified. Accordingly it is possible that if a large disturbance is experienced in the exhaust gas air:fuel ratio the storage capacity of the catalysts may be exceeded and some undesirable emissions may pass to atmosphere even if closed loop feedback control is fast and accurate.

Vehicle engines may have selectable features to permit operation in alternative modes. For example a dual camshaft arrangement can provide for low valve lift and higher valve lift to give a wider range of cam timing relationships over the engine load/speed map. A diagnostic is required to confirm operation of the correct mode, because otherwise the engine will have inappropriate valve timing and for example may be inappropriately fuelled; as a consequence undesirable emissions may not be adequately controlled.

A diagnostic may for example rely upon analysis of exhaust gas during a momentary forced change of camshaft condition, whereby for example high lift mode is selected, thus allowing a different quantity of air to enter the respective cylinders. Combustion in these cylinders will be affected, with a consequent effect upon exhaust gas constituents. Thus in this example a change in exhaust composition can indicate correct operation of a high lift camshaft condition, whereas unchanged composition can indicate a malfunction.

A diagnostic of this kind must be periodically repeated in order to provide a regular check on correct operation of a cam profile switching arrangement. Legislation may require that operation of the diagnostic be recorded in a vehicle system, for subsequent review and/or analysis.

Each time the diagnostic is performed, a momentary increase in undesirable emissions may occur since it is the change in exhaust constituents that allows correct cam switching to be confirmed. The diagnostic is preferably performed for the minimum time period to give a reliable reading at the oxygen sensor, but nevertheless an increase in undesirable emissions could still occur.

What is required is a diagnostic which further reduces the possibility of undesirable emissions, yet uses the existing strategy of a momentary forced change of camshaft condition.

SUMMARY OF THE INVENTION

According to one aspect of the invention there is provided a diagnostic method for indicating correct operation of a cam profile switching system of an internal combustion engine, said method comprising operating the engine in a first condition of the cam profile switching system, sampling exhaust gas constituents associated with said first condition, forcing the cam profile switching system to a second condition of the cam profile switching system whilst making a corresponding adjustment to fuelling, sampling exhaust gas constituents associated with the second condition, comparing the outputs of the first and second sampling steps and determining that said camshaft switching system has operated correctly if said outputs are substantially the same.

The diagnostic of this aspect of the invention is thus arranged to indicate correct operation of the camshaft switching system with substantially unchanged combustion conditions, and accordingly whilst the system continues to operate satisfactorily, no increase in undesirable emissions results from operation of the diagnostic. This is a major advance over the prior art, where an increase in undesirable emissions may have occurred as a result of operation of the diagnostic.

In this aspect of the invention, the contrary result of a substantial change in exhaust constituents is an indication of a malfunction. Thus it can be concluded that a change in fuelling during the diagnostic has not been accompanied by the corresponding change in air flow which could be expected for the alternative cam profile, and typically combustion is no longer stoichiometric.

In practice, the threshold indicative of correct operation of the cam profile switching system, or a malfunction thereof, may vary according to speed and load of the engine when the diagnostic is performed. The thresholds may for example be retained in a memory associated with an electronic control unit (ECU) for controlling the vehicle engine in accordance with one or more operating maps.

The outputs of the first and second samplings may be considered substantially the same if differing by no more than 5%. The outputs of the first and second samplings may be considered indicative of a malfunction if differing by more than 15%. The difference range 5-15% may be considered indeterminate.

In the case of an indeterminate result, the diagnostic may be repeated at the next appropriate opportunity, or after a pre-determined period. The diagnostic may also be declared incomplete, and thus not recorded in a register.

A control logic of the vehicle may be provided, for example in the ECU to decide what action to take in the event of non-indication of correct cam profile switching (e.g. a warning message may be presented to driver warning of the need to have engine checked and/or the engine performance may be restricted). In the case of correct cam profile switching, no information is required to be presented to the driver, but operation of the diagnostic may be recorded in a register.

In an embodiment oxygen content of the relevant exhaust gas stream is sensed by one or more appropriately mounted oxygen sensors of a conventional kind. Other constituents of the exhaust gas may be sensed if capable of showing a significant difference during operation of the diagnostic with a malfunctioning cam profile switching system.

According to another aspect of the invention there is provided a diagnostic method for indicating correct operation of a cam profile switching system of an internal combustion engine, comprising operating the engine in the first condition of the cam profile switching system, sampling exhaust gas constituents associated with said first condition, determining a total fuelling offset value for the first condition of the cam profile switching system, forcing the cam profile switching system to a second condition of the cam profile switching system whilst making a corresponding adjustment to fuelling, sampling exhaust gas constituents associated with said second condition, determining a total fuelling offset value for the second condition of the cam profile switching system, comparing the total fuelling offset values of the first and second sampling steps and determining that said camshaft switching system has operated correctly if said total fuelling offset values are substantially different.

In this embodiment, the total fuelling offset value associated with the first condition is based upon the closed loop fuelling control parameters, and the total fuelling offset value associated with the second condition is based upon the closed loop fuelling control parameters and the adjustment to fuelling.

This aspect of the invention is applicable to engines having cylinders grouped as sub-sets, for example a Vee engine where a fuelling offset may be applied to one or both banks of cylinders. The comparison of fuelling offset values results in a dimensionless ratio, which should be closed to 1 for an engine in good condition.

In further aspects the invention provides apparatus for implementing the methods outlined above, in particular engine control apparatus, an engine controlled by suitable control apparatus, and a vehicle incorporating an engine so controlled.

Within the scope of this application it is envisaged that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, except where such features are incompatible.

BRIEF DESCRIPTION OF DRAWINGS

Embodiments of the invention will now be described, by way of example only, with reference to the accompanying drawings, in which.

DETAILED DESCRIPTION

Figure 1:
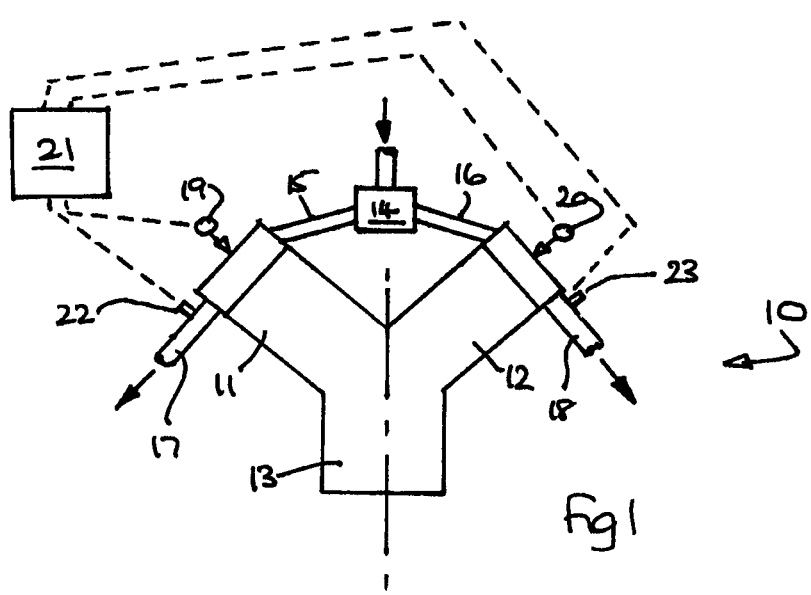
FIG. 1 is a schematic drawing of a multi-cylinder Vee engine.

FIG. 1 illustrates in schematic cross-section a Vee engine (10) of for example six cylinders, and having left and right cylinder banks (11, 12) mounted to a common crankcase (13). A common air supply (14) feeds each bank via a respective inlet tract (15, 16), and each bank has its own respective exhaust tract (17, 18). A high pressure fuel injection rail (19, 20) is provided for each bank.

Within each cylinder head is a cam profile switching system of conventional kind, which permits switching on-demand between high lift and low lift conditions for the inlet valves. The cam profile switching systems are generally actuated together in normal engine operation so that the selected operating condition is common, but they are also actuated independently in the diagnostic of this invention.

A conventional electronic control unit (ECU) (21) is provided to control engine fuelling and other systems in accordance with driver demand and emissions legislation. Within each exhaust tract a lambda (oxygen) sensor (22, 23) is provided, and adapted to send an instantaneous indication of air/fuel ratio to the ECU.

The ECU is typically provided with a fuelling map, for example in a read only memory, for ensuring that the correct quantity of fuel is delivered to the individual cylinder fuel injectors according to driver demand and other relevant factors.

In an engine according to this invention, two camshaft conditions are provided, and each has an associated fuelling map to ensure that air and fuel flow are generally adapted to stoichiometric combustion.

The ECU is adapted to calculate from the control parameters of the closed loop fuelling system for each exhaust a measure of the closed loop fuelling offset being applied to each cylinder bank. The ECU then relates the closed loop fuelling offset of the left and right bank to one another as a dimensionless ratio L/R.

In an alternative embodiment the ECU is adapted to combine parameters from the closed loop fuelling system for each exhaust with the fuelling adjustment applied during diagnostic operation to generate a measure of the total fuelling offset being applied to each cylinder bank. The ECU then relates the total fuelling offsets of the left and right bank to one another as the dimensionless ratio L/R.

In an engine of good condition, with each bank (11, 12) contributing equally, the standard ratio L/R is usually very close to 1, and typically has a variation not greater than ±5%.

The camshaft diagnostic of the invention is preferably operated in a throttle-off condition, where it is less noticeable to the driver. In this condition the camshafts are typically in a low lift condition.

Figure 2:
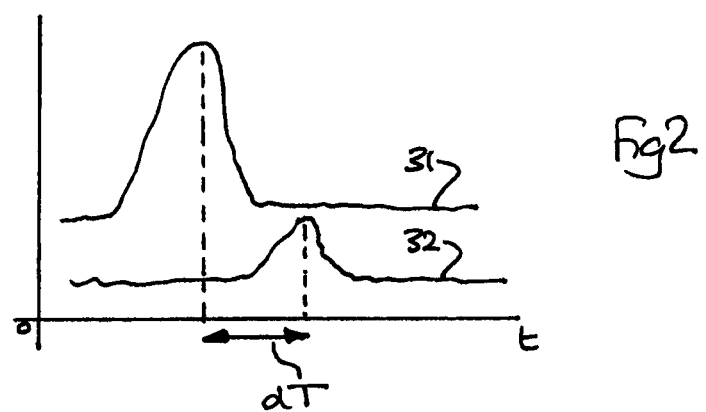
FIG. 2 illustrates the time delay between a change in fuelling and detection of corresponding exhaust emissions.

FIG. 2 illustrates a plot of momentary increase of fuel or air flow (31) against a corresponding change in the concentration of exhaust emissions (32), and the corresponding delay dT at a pre-determined engine rpm (or exhaust mixture volumetric flow rate). This delay dT will generally reduce as engine rpm, and hence speed of exhaust flow (volume flow rate), increases. If fuelling is adjusted according to change of air flow, the characteristic (32) will be flat, but the time dT nevertheless indicates the lag between change of inlet conditions, and detection of corresponding exhaust constituents.

In the invention, the camshaft of one bank, for example bank (11), is momentarily forced to a high lift condition, and as a result the throughput of air changes. At the same time fuelling of this bank is adjusted, by reference to the fuel map or other reference, to compensate for the changed throughput of air. As a result the exhaust gas constituents remain substantially unchanged if stoichiometric combustion is maintained.

The corresponding throughput of air in second bank may also change as air is drawn differently through the first bank, and if so fuelling of the second bank is adjusted to compensate for the change of air flow, so as to maintain unchanged combustion conditions.

During the momentary high lift condition of one bank, with allowance for delay dT, the ratio L/R is recalculated and compared with the initial ratio L/R. In the initial embodiment, if the ratio L/R is substantially changed, typically ±15%, an incorrect camshaft position is indicated. If the ratio L/R is within ±5% (i.e. unchanged) of the initial ratio L/R, a correct camshaft position is indicated.

However conversely in the alternative embodiment if the ratio L/R is substantially changed, typically ±15%; a correct camshaft position is indicated whilst If the ratio L/R is within ±5% (i.e. unchanged) of the initial ratio L/R, an incorrect camshaft position is indicated.

Thus it can be determined whether the cam profile switching system is working correctly.

An indeterminate result, may result in a repeat of the diagnostic at an earlier time than would otherwise be scheduled. The diagnostic may for example be repeated immediately if operating conditions of the vehicle are suitable, typically a trailing or throttle-off condition.

Operation of the diagnostic is generally recorded in a register of the vehicle, for example a memory of the ECU, for checking and servicing purposes. An indeterminate result may be considered incomplete, and not recorded, since a conclusion is not reached. Subsequent or repeated operation of the diagnostic, typically under slightly changed engine operating conditions, is then performed.

The cam profile switching system may revert to the original condition before the corresponding exhaust gas stream has reached the sensor. Provided that cam profile switching is sufficiently long to provide a detectable change of exhaust gas constituents, early reversion is acceptable and will minimize the risk of undesirable emissions should the cam profile switching system be malfunctioning. The time delay may be determined empirically, and will necessarily vary according to engine type, exhaust type and sensor location.

The invention claimed is:

1. A diagnostic method for indicating correct operation of a cam profile switching system of an internal combustion engine having a plurality of cylinders with some of the cylinders in a first group and others of the cylinders in a second group, the method comprising:
   operating the engine with both groups in a first condition of the cam profile switching system;
   sampling first exhaust gas constituents associated with the first group in said first condition;
   sampling second exhaust gas constituents associated with the second group in the first condition;
   determining a first ratio by relating the first exhaust gas constituents to the second exhaust gas constituents;
   forcing the cam profile switching system of the second group to a second condition of the cam profile switching system while making a corresponding adjustment to fuelling for the second group;
   sampling third exhaust gas constituents associated with the second group in said second condition;
   determing a second ratio by relating the first exhaust gas constituents to the third gas constituents;
   comparing the first and second ratios; and
   either
   (i) determining whether the camshaft switching system of the second group has operated correctly based on a difference between the first and second ratios when the difference is less than or equal to 5% or greater than of equal to 15%, or
   (ii) obtaining an indeterminate result when the difference is between 5% and 15%.

2. The method of claim 1, wherein the camshaft switching system of the second group operated correctly if the difference is less than or equal to 5%.

3. The method of claim 1, wherein the camshaft switching system of the second group operated correctly if the difference is greater than or equal to 15%.

4. The method of claim 1, wherein said cam profile switching system of the second group is momentarily forced to the second condition for a period just sufficient to allow said sampling the third exhaust constituents to be effective.

5. The method of claim 4, wherein said cam profile switching system of the second group reverts to said first condition before said sampling the third exhaust constituents takes place.

6. The method of claim 1, wherein the engine is a V engine group.

7. The method of claim 1, wherein the exhaust gas constituents are sampled by one or more oxygen sensors downstream of a location where combustion occurs.

8. A diagnostic method for indicating correct operation of a cam profile switching system of an internal combustion engine having a plurality of cylinders with some of the cylinders in a first group and others of the cylinders in a second group, the method comprising:
   operating the engine with both groups in a first condition of the cam profile switching system;
   sampling first exhaust gas constituents associated with the first group in said first condition;
   determining a first total fuelling offset value for the first group in the first condition of the cam profile switching system;
   sampling second exhaust gas constituents associated with the second group in the first condition;
   determining a second total fuelling offset value for the second group in the first condition of the cam profile switching system;
   determining a first ratio by relating the first total fuelling offset value to the second total fuelling offset value;
   forcing the cam profile switching system of the second group to a second condition of the cam profile switching system while making a corresponding adjustment to fuelling;
   sampling third exhaust gas constituents associated with the second group in said second condition;
   determining a third total fuelling offset value for the second group in the second condition of the cam profile switching system;
   determining a second ratio by relating the first total fueling offset value to the third total fuelling offset value;
   comparing the first and second ratios; and
   either
   (i) determining whether the camshaft switching system of the second group has operated correctly based on a difference between the first and second ratios when the difference is less than or equal to 5% or greater than or equal to 15%, or
   (ii) obtaining an indeterminate result when the difference is between 5% and 15%.

9. The method of claim 8, including determining that the camshaft switching system of the second group has not operated correctly if the difference is less than or equal to 5%.

10. The method of claim 8, including determining that the camshaft switching system of the second group has not operated correctly if the difference is greater than or equal to 15%.

11. An apparatus comprising:
   an electronic control unit configured to adjust a cam profile switching system of an engine having a plurality of cylinders with some of the cylinders in a first group and others of the cylinders in a second group, the electronic control unit being configured to adjust fuelling associated with cylinders affected by cam profile switching;
   an exhaust gas sensor adapted to detect a fuelling related change of exhaust gas constituents; and wherein said electronic control unit is configured to
operate both groups of cylinders in a first condition of the cam profile switching system;
sample first exhaust gas constituents associated with the first group in said first condition;
determine a first total fuelling offset value for the first group in the first condition of the cam profile switching system;
sample second exhaust gas constituents associated with the second group in the first condition;
determine a second total fuelling offset value for the second group in the first condition of the cam profile switching system;
determine a first ratio by relating the first total fuelling offset value to the second total fuelling offset value;
force the cam profile switching system of the second group to a second condition of the cam profile switching system while making a corresponding adjustment to fuelling;
sample third exhaust gas constituents associated with the second group in said second condition;
determine a total fuelling offset value for the second group in the second condition of the cam profile switching system;
determine a second ratio by relating the first total fuelling offset value to the third fuelling offset value;
compare the first and second ratios; and
either
(i) determine whether said camshaft switching system of the second group has operated correctly based on a difference between the first and second ratios when the difference is less than or equal to 5% or greater than or equal to 15%, or
(ii) obtaining an indeterminate result when the difference is between 5% and 15%.

12. An apparatus according to claim 11, including a register to record completion of the diagnostic method.

13. The apparatus of claim 11, wherein the controller is configured to determine that the camshaft switching system of the second group has operated properly if the difference is less than or equal to 5%.

14. The apparatus of claim 11, wherein the controller is configured to determine that the camshaft switching system of the second group has operated properly if the difference is greater than or equal to 15%.

\* \* \* \* \*